July 23, 1940.                T. M. BERRY                2,209,220
                            WEFT STRAIGHTENER
                         Filed June 29, 1939            2 Sheets-Sheet 1

Inventor:
Theodore M. Berry,
by Harry C. Dunham
His Attorney.

July 23, 1940.     T. M. BERRY     2,209,220
WEFT STRAIGHTENER
Filed June 29, 1939     2 Sheets-Sheet 2
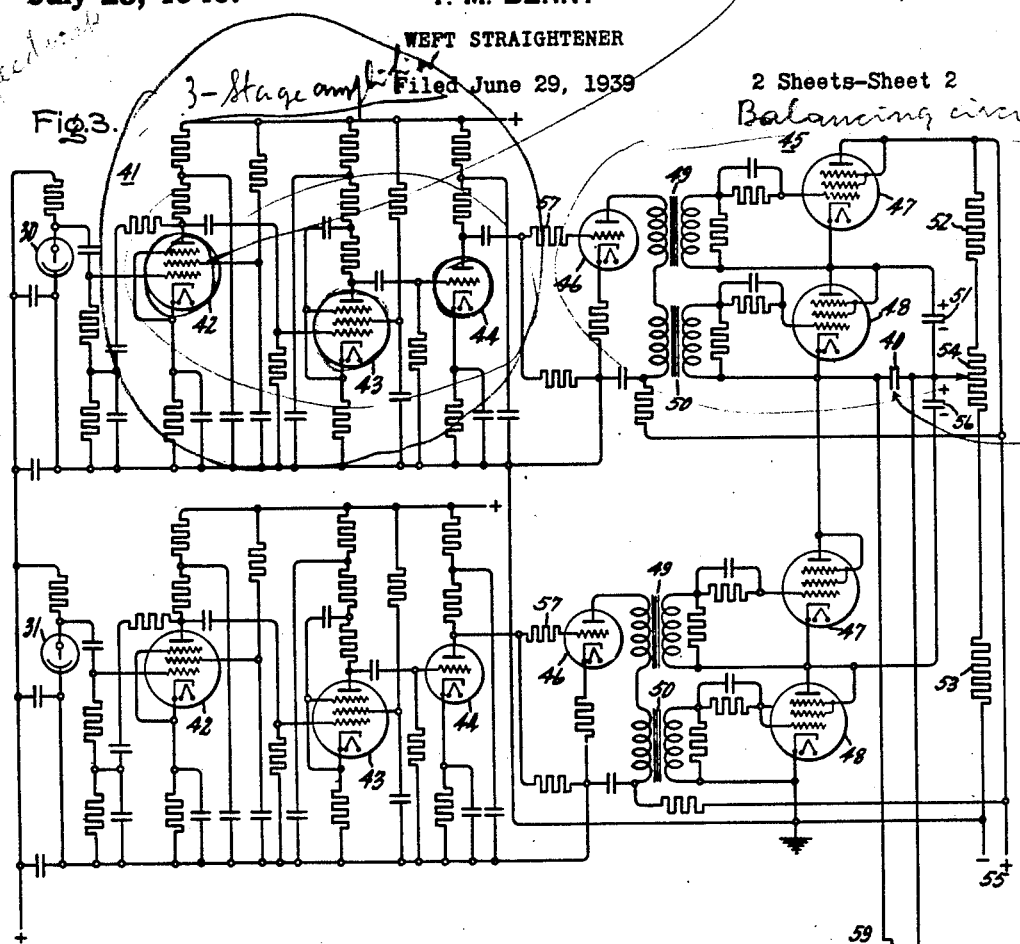
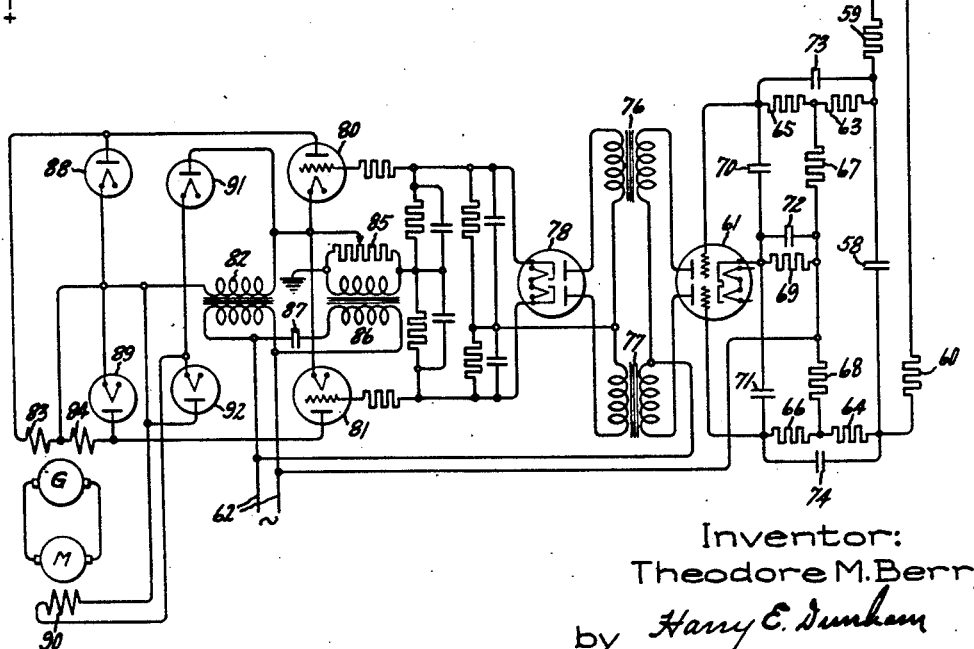
Inventor:
Theodore M. Berry,
by Harry E. Dunham
His Attorney.

Patented July 23, 1940

2,209,220

UNITED STATES PATENT OFFICE 2,209,220

WEFT STRAIGHTENER

Theodore M. Berry, Schenectady, N. Y., assignor to General Electric Company, a corporation of New York Application June 29, 1939, Serial No. 281,870

11 Claims. (Cl. 26—51)

My invention relates to apparatus for straightening the weft elements of a strip of moving woven material, the same being a further development of apparatus for that purpose disclosed and claimed in the La Pierre Patent 2,106,611 and in the La Pierre and Menger Patent 2,106,612.

It is an object of my invention to provide an improved form of apparatus for the above-mentioned purpose whereby correction of the lack of straightness of the weft elements, such as a skew thereof, is made continuously in accordance both with the amount thereof and with the speed of the moving strip. Another object is to enable the automatic straightening of certain grades of woven material which were not readily straightened heretofore. A further object is to overcome certain difficulties heretofore experienced in switching and braking the correcting motor.

Figure 1:
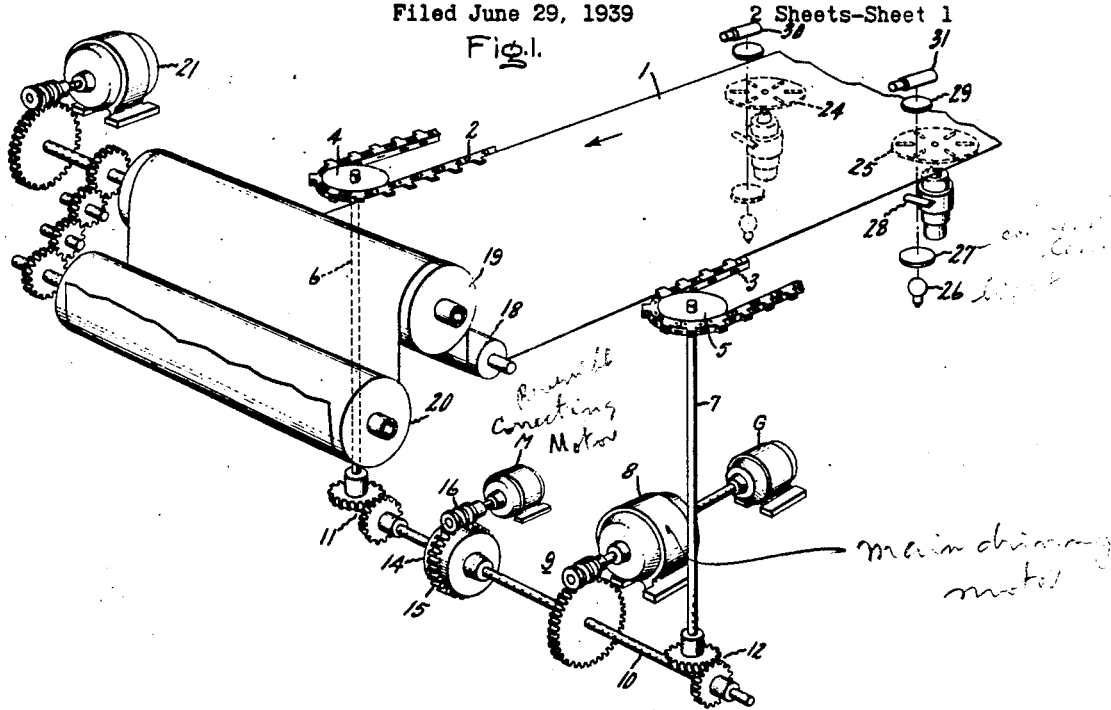
Figure 2:
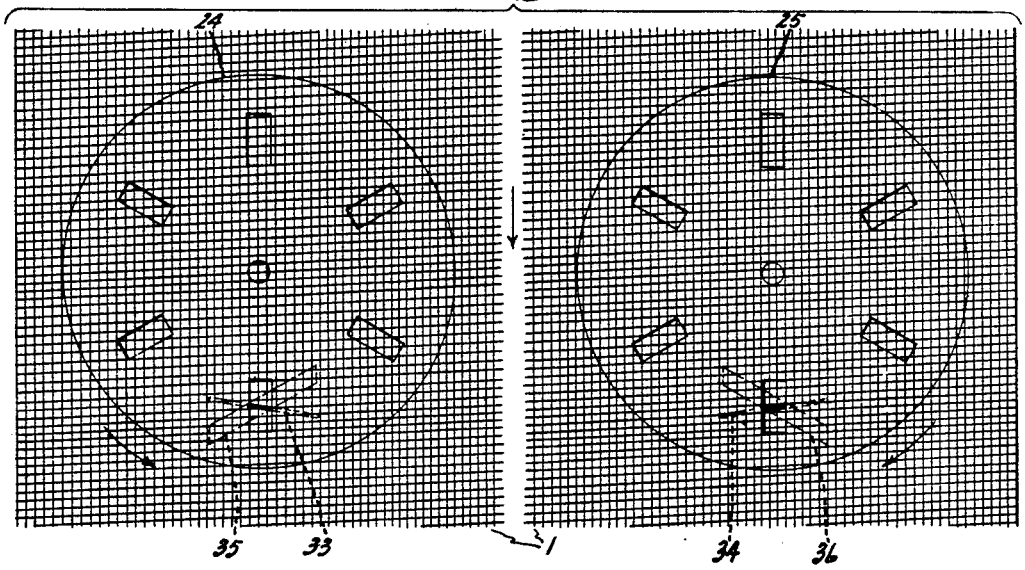

Referring to the drawings, Fig. 1 is a perspective view of one form of apparatus embodying my invention; Fig. 2 is a detail of the light beam controlling apparatus shown in Fig. 1; Fig. 3 is a circuit diagram. In the drawings, Fig. 1, the strip of woven material is shown having its opposite edges engaged and moved forward by a tenter of well-known form comprising the endless chains 2 and 3 which are driven by the sprockets 4 and 5 respectively and each of which comprises a series of grippers which automatically grip an edge of the woven material to draw it forward and also to stretch it laterally.

The two sprockets 4 and 5 mounted on the vertical shafts 6 and 7 are driven by the main driving motor 8 through the worm gearing 9, the horizontal shaft 10 and the mitre gears 11 and 12. For the purpose of producing a slight change in the relative speeds of the two tenter chains in order to remove any skew that may occur in the woven material there is interposed in the shaft 10 the differential 14 which includes the ring gear 15 with which meshes the worm 16 on the shaft of the reversible correcting motor M. Operation of the motor M has the effect of changing the relative speeds of the tenter chains in the same manner as in the aforesaid La Pierre and Menger Patent 2,106,612. My apparatus which will be described later, the armature of the motor 8 is connected to the armature of the generator G which is shown mounted on the shaft of the driving motor 8. Also by the apparatus to be described later the field of the generator G is varied both as to polarity and as to strength in accordance with the amount and character of any skew which is detected in the strip as a result of this arrangement. Therefore, it will be seen that the correcting motor M operates in response both to the speed of the strip and to the amount and correction of any skew which may be detected therein.

The strip 1 after leaving the tenter chains passes over the idler roll 18 and thence over a number of heated drying rolls, of well-known construction, shown in part at 19 and 20, and driven by the motor 21.

The apparatus employed for detecting a lack of straightness of the weft elements of the strip 1 is similar to that disclosed in the afore-mentioned La Pierre Patent 2,106,611. This apparatus comprises the two disks 24 and 25 each having radial slots and being driven by a separate electric motor, the disks being arranged directly beneath the strip and adjacent opposite edges thereof. Associated with each disk is an optical system comprising the light source 26, the condensing lens 27, the cylindrical lens 28 and the second condensing lens 29 whereby a narrow transverse beam of light is projected on the disk, a portion passing through one of the slots in the disk to the strip. Above the two disks 24 and 25 are arranged the two photoelectric devices 30 and 31, respectively, in position to receive the light passed by the slots in the disks and the strip. While the construction of the detecting apparatus is similar to that disclosed by the above-mentioned La Pierre patent it differs therefrom in one important respect for upon reference particularly to Fig. 2, it will be seen that the narrow light beams represented by the dotted lines 33 and 34 are inclined slightly to a line perpendicular to the warp elements of the strip. The direction of inclination is toward a line perpendicular to the path of travel, shown by the dotted lines 35 and 36, of the light beam on the strip resulting from the combined action of the rotation of the disks and the forward movement of the strip. The reason for inclining the light beams 33 and 34 is to facilitate the straightening of the weft elements of certain grades of material which were not readily straightened automatically heretofore. By thus inclining the light beams a few degrees one beam will more nearly align itself with the weft elements when skew occurs therein thereby accentuating the change in light transmitted to the corresponding photoelectric device by the passage of each weft element. Since it has been found desirable that the impulses from the photoelectric device producing the higher frequency shall have the higher amplitude the light beams have been given the particular relative inclination described above and as shown on the drawings.

Reference is now made to Fig. 3 for an understanding of the apparatus which I employ in this case for controlling the operation of the correcting motor M in response to a difference in output frequency of the two photoelectric devices 30 and 31. As in the above-mentioned La Pierre patent a main capacitor is employed, shown at 40, which has no charge if there is no skew in the strip but will be given a charge of one polarity or the other if skew occurs, the polarity of the charge depending upon the direction of the skew. The effect of charge on the capacitor 40 is to energize the field of the generator G, the polarity of the field depending upon the polarity of the capacitor charge. Thus, the armature shaft of the motor M will turn if the capacitor becomes charged, the direction of rotation being dependent on the polarity of the charge and the speed being dependent upon the amount of the charge and the speed of the strip.

Inasmuch as the two photoelectric devices connect with similar amplifying and controlling apparatus the description will be confined to that associated with but one device, namely device 30. The output of device 30 is amplified by the three stage amplifier 41 comprising the capacitance coupled electron discharge devices 42, 43 and 44 of which the first stage is provided with a negative feed back to improve the high frequency response and in the second stage a hum bucking circuit is used.

The output of the above-described amplifier feeds into the balancing circuit 45 comprising the electron discharge devices 46, 47 and 48, the latter two being biased by using a grid leak and capacitor, and the transformers 49 and 50 which preferably are connected in such a manner that the effect of the capacitance between the two tarnsformers is minimized, thus improving the operation of the system at high frequencies. Connected with the output side of the balancing circuit is the auxiliary capacitor 51 and a portion of a voltage divider including the resistors 52, 53 and the potentiometer 54 connected across a suitable voltage source 55. The transformers 49 and 50 are reversed with respect to each other whereby at each impulse making the control grid of the device 47 positive and capacitor 51 may receive a charge increment from one half of the voltage divider and at each impulse making the control grid of the device 48 positive, the device 47 at that instant being inactive, a charge increment may be transferred from the capacitor 51 to the main capacitor 40. An identical balancing circuit including the auxiliary capacitor 56 and controlled by the photoelectric device 31 in like manner alternately permits the capacitor 56 to receive a charge increment from the other half of the divider and allows a charge increment to be transferred to the capacitor 40. The charges transferred by the capacitors 51 and 56 are of opposite polarity, hence, just as in the above-mentioned La Pierre patent, if the light impulses affecting the two photo-electric devices 30 and 31 have the same frequency, indicating no skew in the strip, then the charges transferred from one capacitor neutralize those of the other and the capacitor 40 has no resulting charge. On the other hand, if skew occurs the light impulses affecting one photoelectric device will have a higher frequency than those affecting the other, and the main capacitor will take on a charge, the polarity and amount of which will depend upon the relative frequencies at which charges are transferred to it from the corresponding auxiliary capacitors 51 and 56.

With strips of certain materials irregularities in the light impulses may occur due to irregular width and spacing of the weft elements resulting in amplitude variations applied to the balancing circuit. Since for the proper operation of this circuit however, it is essential that variations in frequency only shall pass I have provided means whereby modulation of the input to the balancing circuit is substantially if not entirely eliminated. This is done by saturating the electron discharge devices 46, namely, by applying a low plate voltage and employing the resistor 57 in series with the grid of each. With the grid leak and condenser bias used with the devices 47 and 48 both devices are biased to cut-off, hence plate current can not flow in both devices simultaneously.

I shall now describe the apparatus by which a charge on the main capacitor 40 controls the direction of rotation and the speed of the correcting motor M. Connected across the main capacitor 40 is the filter circuit including the capacitor 58 and the resistors 59 and 60 to remove any alternating current components in the voltage across the main capacitor. A charge of one polarity or the other on the capacitor 58 controls the grid circuits of the electron discharge device 61, shown as a double triode, which has its anode circuit supplied by alternating current from the source 62 which, for example, may be a 110 volt, 60 cycle source. Associated with the grid circuits of the device 61 is the net work comprising the resistors 63, 64, 65, 66, 67, 68 and 69 and the filter capacitors 70, 71 and 72. Capacitors 73 and 74 by bridging respectively the resistors 63, 65 and 64, 66 become charged by the potential drop across the corresponding resistors whenever the capacitor 58 becomes charged so that in the event of a sudden decrease in or the elimination of the skew which caused the charge on the capacitor 58 the charge left on one or both of the capacitors 73, 74 exercises a certain amount of control over the device 61 for the time being. This, in effect, causes the apparatus to anticipate a reversal of the skew and prevents an oscillation of the system.

The anode circuit of the device 61 includes the primaries of the transformer 76 and 77 the secondaries of which connect through the twin diode rectifier 78 with the input circuits of the gas discharge devices 80 and 81. The anode circuits of these devices are supplied from the transformer 82 fed from the source 62, and include respectively the two halves 83 and 84 of the generator field winding whereby one or the other of these windings is energized in accordance with the character of any skew detected in the strip. In order that the amount of such energization shall vary with the charge on the capacitor 58 and hence with the amount of skew detected an approximately 90° phase displaced bias is applied to the grids of the devices 80 and 81. As shown on the drawing this is obtained from the potentiometer 85 across which is the secondary of the transformer 86 whose primary is energized from the source 62 through the phase displacing capacitor 87. Across the sections 83 and 84 of the generator field winding are the rectifiers 88 and 89 through which current due to the stored energy in the winding may pass during half of each alternating current cycle when the devices 80 and 81 cease passing current. The field winding 90 of the correcting motor M is supplied by current from the transformer 82 rectified by the rectifier 91. Another rectifier 92 allows current due to the energy stored in the motor field winding to discharge therethrough.

If it is desired to correct bow as well as skew in the material one may employ a third unit comprising a rotating disk, optical system, amplifier, etc. corresponding to that represented by C in the afore-mentioned La Pierre patent. Such a third unit would be a duplicate of the unit including the disk 24 and in combination with that unit would function to detect bow just as in that patent. A motor such as M may be used to operate bow correcting means such as disclosed in the aforesaid La Pierre patent or if desired it may be used to correct bow in some other well-known manner as, for example, by varying the speed of the drying rolls.

I have chosen the particular embodiment described above as illustrative of my invention and it will be apparent that various modifications may be made without departing from the spirit and scope of my invention which modification I aim to cover by the appended claims.

What I claim as new and desire to secure by Letters Patent of the United States is:

1. Apparatus for straightening the weft elements of a strip of moving woven material comprising means for detecting a lack of straightness of said elements and means for correcting the same in accordance with the amount thereof and the speed of the strip.

2. Apparatus for straightening the weft elements of a strip of moving woven material comprising means for detecting a lack of straightness of said elements, and means operated continuously during the detected presence thereof and at a rate controlled by the speed of the strip for straightening said elements.

3. Apparatus for straightening the weft elements of a strip of moving woven material comments for detecting a lack of straightness of said elements, motor driven straightening means for said weft elements and means for energizing said motor simultaneously in accordance with the speed of the strip and the detected amounts by which the weft elements lack of being straight.

4. Apparatus for straightening the weft elements of a strip of moving woven material comprising means for detecting a lack of straightness of said elements, motor driven straightening means for said weft elements, a generator connected to actuate said motor and driven in accordance with the speed of said strip and means for varying the strength and polarity of the field of said generator in accordance respectively with the amount by which the weft elements lack of being straight and the direction thereof.

5. Apparatus for straightening the weft elements of a strip of moving woven material comprising a capacitor, means for giving said capacitor a charge in accordance with the amount that said weft elements depart from a straight condition and of a polarity in accordance with the character of said departure, motor driven straightening means for said weft elements, a generator having its armature connected to actuate said motor and means including electron discharge devices for varying the field of said generator in accordance with the amount of charge on said capacitor and for determining the polarity of said field in accordance with the polarity of said charge.

6. In weft straightening apparatus having means for producing impulses at a frequency which varies with the angle between the warp and weft elements of the material, the combination of a source of current supply, a capacitor, an electron discharge device having its output circuit connected to control the charging of said capacitor from said source, a second capacitor, a second electron discharge device having its output circuit connected to control the transfer of charge from the first to the second of said capacitors, each of said devices having a grid circuit provided with a capacitor and grid leak resistance, a saturated electron discharge device having its input circuit connected with said impulse producing means and transformer means connecting its output circuit with the grid circuits of said devices.

7. In weft straightening apparatus having means for producing impulses subject to amplitude variations and having a frequency which varies with the angle between the warp and weft elements of the material, the combination of a source of current supply, a capacitor, an electron discharge device having its output circuit connected to control the charging of said capacitor from said source, a second capacitor, a second electron discharge device having its output circuit connected to control the transfer of charge from the first to the second of said capacitors, means for converting said impulses into impulses of constant amplitude, means for supplying said constant amplitude impulses to the input circuit of each of said devices and means in each of said input circuits for preventing the flow of charging current to both of said capacitors simultaneously.

8. In weft straightening apparatus having means for producing impulses subject to amplitude variations and having a frequency which varies with the angle between the warp and weft elements of the material, the combination of a source of current supply, a capacitor, an electron discharge device having its output circuit connected to control the charging of said capacitor from said source, a second capacitor, a second electron discharge device having its output circuit connected to control the transfer of charge from the first to the second of said capacitors, each of said devices having a grid circuit provided with a capacitor and grid leak resistance, a saturated electron discharge device having its input circuit connected with said impulse producing means and transformer means connecting its output circuit with the grid circuits of said devices.

9. In apparatus for detecting an inclination of the weft elements to a perpendicular to the warp elements of a moving strip of woven material comprising a photoelectric device, means for directing a narrow beam of light through said material to said device, said beam of light being inclined in the same manner as said weft elements at the point of intersection thereof, and means for moving said beam laterally of the strip simultaneously with the movement of the strip.

10. Apparatus for detecting a lack of perpendicularity between the warp and the weft elements of a moving strip of woven material comprising means for projecting a plurality of narrow beams of light on said strip at laterally spaced portions thereof, means for moving said beams laterally of said strip, a photoelectric device arranged to receive the light of each beam traversing the material, said beams being inclined to a perpendicular to the warp elements of the material whereby at one of said portions the light beam more nearly corresponds in direction with the weft elements than does the beam at the other of said portions and a device responsive to a difference in the output frequencies of said photoelectric devices.

11. Apparatus for detecting a skew in the weft elements of a moving strip of woven material comprising means for projecting a plurality of narrow light beams on said strip at laterally spaced portions thereof, said beams being oppositely inclined to a perpendicular to the warp elements of the material, means for moving said beams in opposite directions laterally of said strip and a device responsive to a difference in the output frequencies of said photoelectric devices.

THEODORE M. BERRY.